Feb. 15, 1966  E. W. TOPPING ETAL  3,234,802
SEQUENCE CONTROLLER MECHANISM
Filed Jan. 18, 1961  4 Sheets-Sheet 3
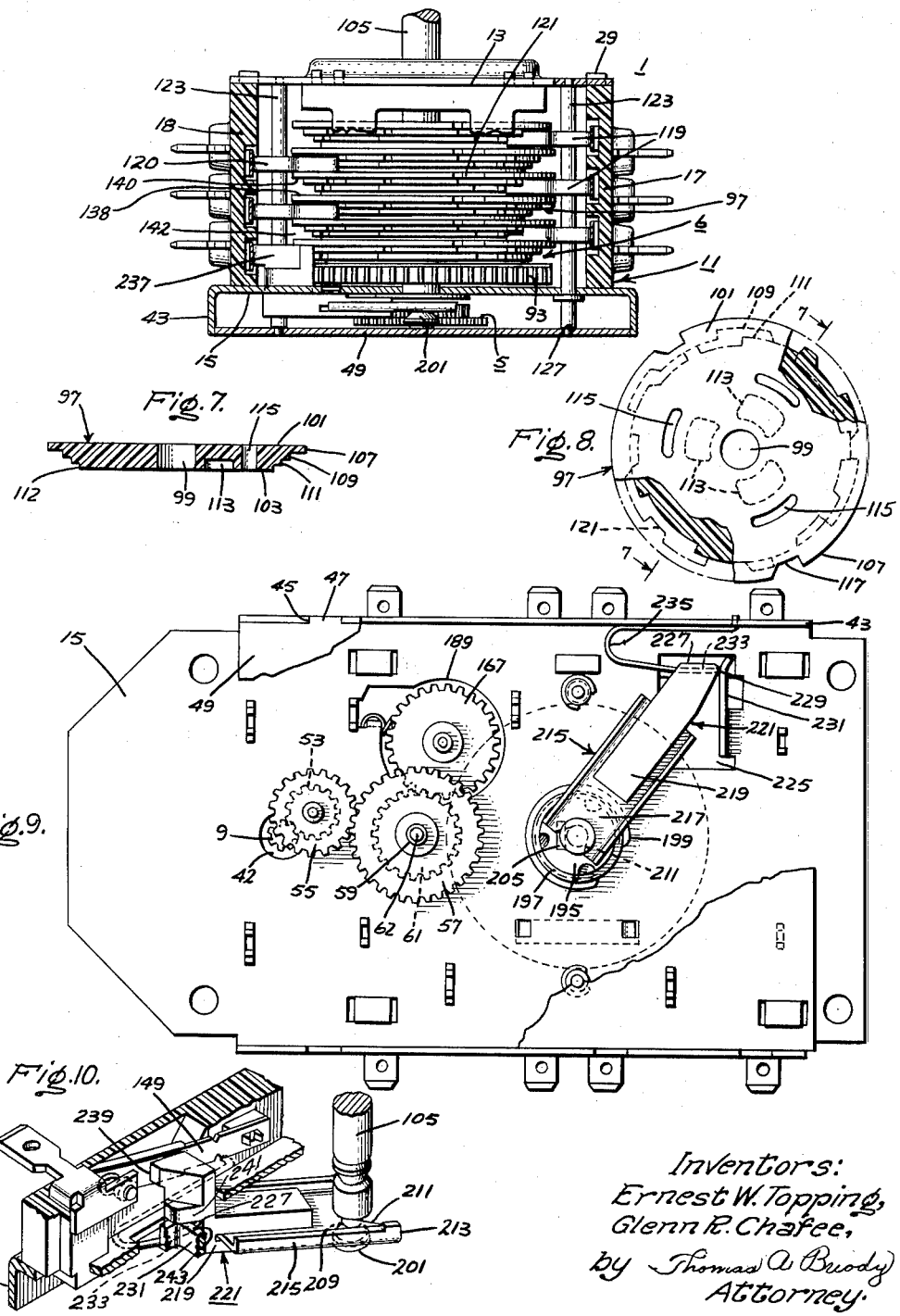
Inventors:
Ernest W. Topping,
Glenn R. Chafee,
by Thomas A. Briody
Attorney.

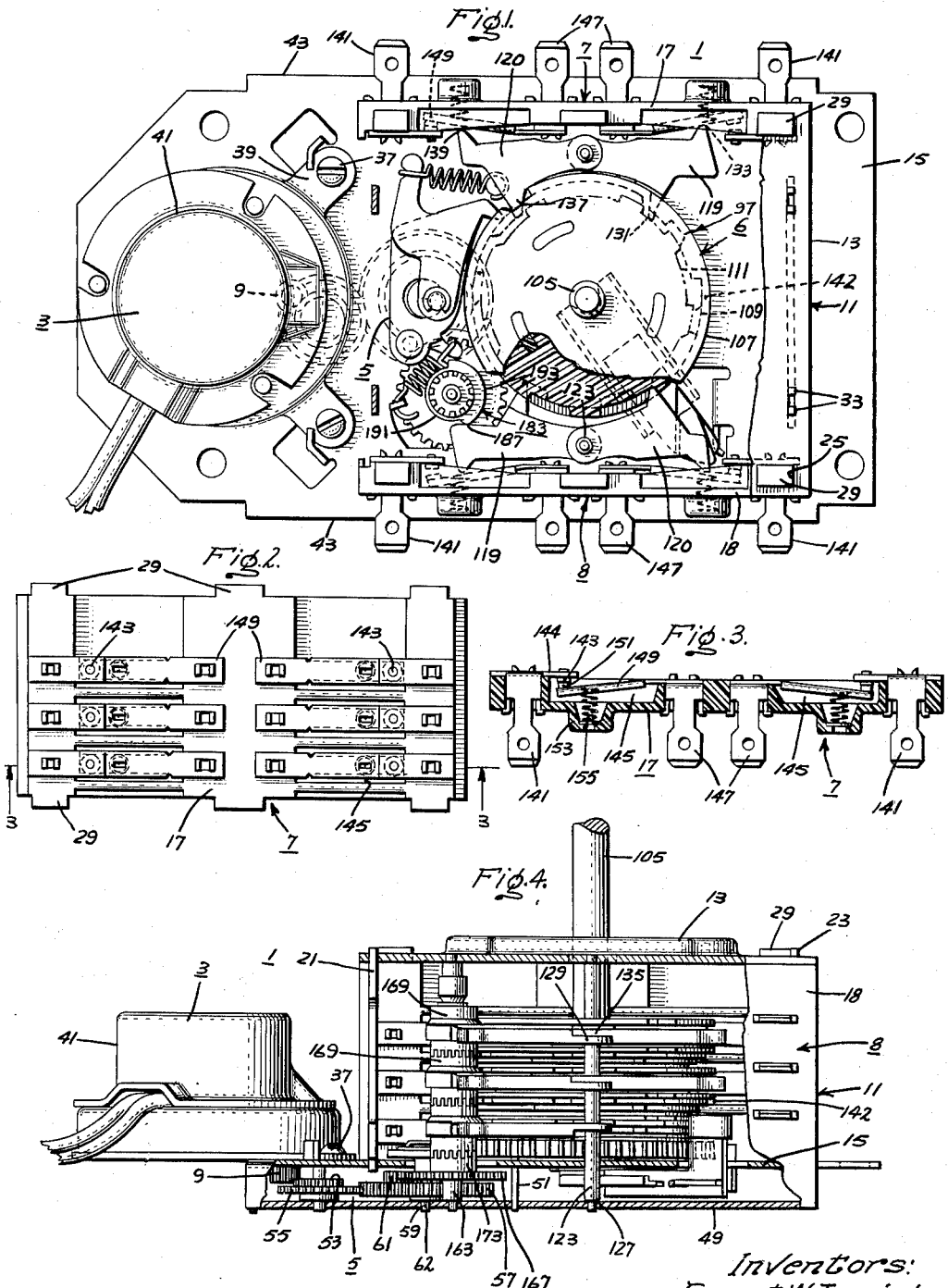

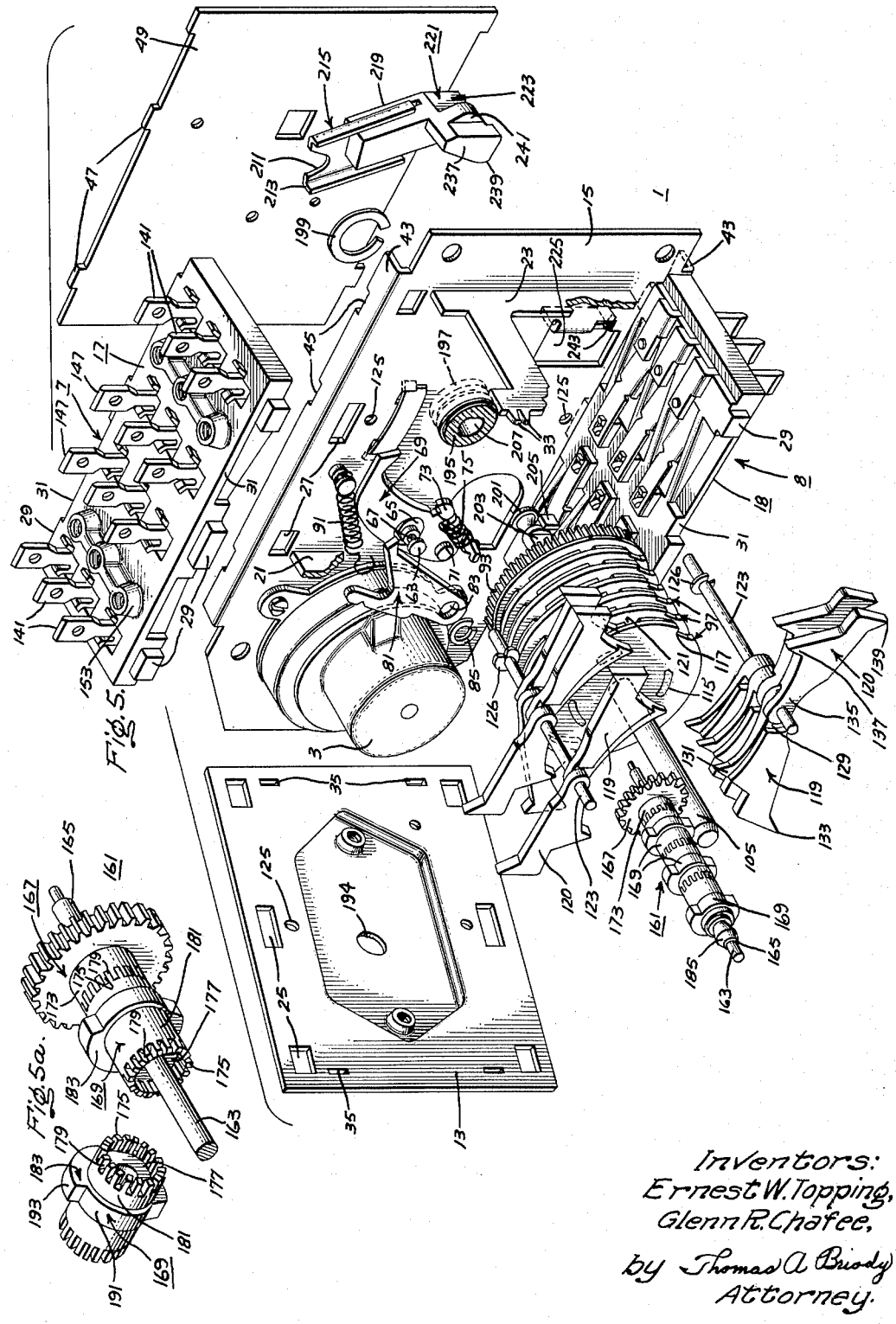

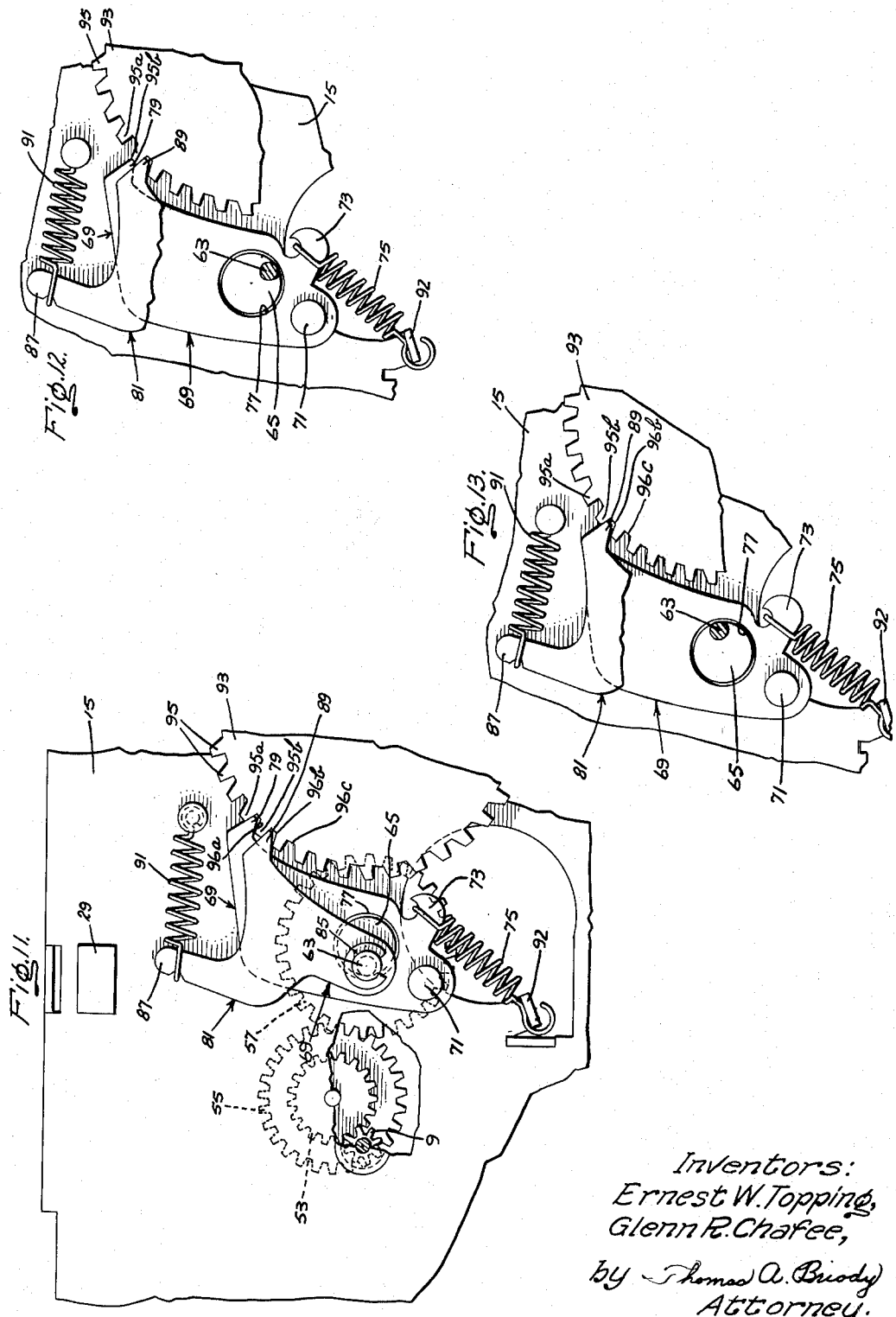

United States Patent Office 3,234,802
Patented Feb. 15, 1966

3,234,802
SEQUENCE CONTROLLER MECHANISM
Ernest W. Topping, Lyndon, Ill., and Glenn R. Chafee, Louisville, Ky., assignors to General Electric Company, a corporation of New York
Filed Jan. 18, 1961, Ser. No. 83,463
15 Claims. (Cl. 74—54)

The present invention relates to sequence controllers and more particularly to a mechanism for operating a plurality of electric switches in accordance with a predetermined sequence or pattern.

An object of this invention is to provide a novel and improved mechanism for operating a plurality of switches or similar control devices in a predetermined sequence.

Another object of this invention is to provide an improved sequence controller mechanism for electric switches, which mechanism may be manufactured at a reduced cost, due to its relative simplicity.

An additional object of this invention is to provide an improved sequence controller that is relatively small in size and compact.

A further object of this invention is to provide a sequence controller for operating a plurality of electric switches, wherein an improved rotatable switch actuating unit operates the electric switches.

It is a still further object of this invention to provide an improved sequence controller mechanism for electric switches, wherein there is employed a novel means for axially spacing cam follower members which operate the electrical switches.

Another object of this invention is to provide an improved sequence controller having a rotatable switch actuating unit that comprises a plurality of stacked cam members which are fastened together in a novel manner to enhance the flexibility and simplicity of manufacture thereof.

A still further object of this invention is to achieve an improved sequence controller mechanism which includes a rotatable aggregation of integrated cam members and a novel arrangement of associated cam followers with a controller housing to form a compact mechanism with an enhanced efficiency.

Another object of this invention is to provide an improved sequence controller of the nature described wherein electric switches are controlled in accordance with a predetermined sequence and contact terminal blocks of the controller form a structural part of the controller housing.

In carrying out the present invention, in one form thereof, there is provided a sequence controller mechanism having a timing motor and a plurality of switches. To operate these switches in a time driven sequence, a plurality of pivoted followers are distributed on opposite sides of a cylindrically configured rotatable operating unit. The operating unit is intermittently driven by the motor, and it includes a plurality of cam members stacked uniformly one upon the other in coaxial fashion. The cam members are similar to each other and each of them is progressively stepped axially so that at one of its ends it has a cylindrical surface of largest diameter and at or near its other end it has a cylindrical surface of smallest diameter. Between these cylindrical surfaces, each cam member also has a cylindrical surface of an intermediate diameter. The cylindrical surface of largest diameter for one cam member is closely adjacent the cylindrical surface of smallest diameter of an axially adjacent cam member. This arrangement provides an annular channel between each adjacent pair of stacked cam members. The followers are arranged so that cam engaging portions of them continuously lie within these channels to limit any axial movement of the followers. Each follower is operated by one or more interruptions in an associated cylindrical surface of smallest or intermediate diameter to actuate one of the switches. To support the controller switches, as well as the rotatable operating unit in a compact over-all housing, the various switches of the controller are mounted in coplanar fashion to insulating boards which serve as structural members on opposite sides of the controller housing.

Further aspects of our invention will become apparent hereinafter, and the specification concludes with claims particularly pointing out and distinctly claiming the subject matter which is regarded as our invention. The invention, however, as to organization and method of operation, together with further objects and advantages thereof, may best be understood by reference to the following description, when taken in conjunction with the accompanying drawings, in which:

FIG. 1 is a front view of our improved sequence controller with the cover plate, main switch actuating unit and other structure partially broken away to illustrate the interior of the controller mechanism;

FIG. 2 is an elevational view of one of the terminal boards of the controller, showing the contacts mounted thereon;

FIG. 3 is a sectional view taken along the line 3—3 of FIG. 2;

FIG. 4 is a bottom view partially broken away and partially in section to show part of the driving means for the sequence controller and other interior structure;

FIG. 5 is an exploded perspective view showing various parts of the controller of FIG. 1 with the end walls partially broken away;

FIG. 5a is an enlarged fragmentary, perspective and partially exploded view of the auxiliary cam gear and auxiliary cams for the sequence controller;

FIG. 6 is a sectional end view of the controller of FIG. 1;

FIG. 7 is a sectional view taken through the center of one of the cam members of the switch actuating unit;

FIG. 8 is a plan view of one of the cam members of the sequence controller, partially in section and partially broken away to illustrate the cylindrical surfaces thereof;

FIG. 9 is a back view of the controller of FIG. 1, with the base or support plate partially broken away to show the driving mechanism;

FIG. 10 is a fragmentary perspective view of the mechanism for actuating one of the switches by the reciprocation of the cam shaft of the controller mechanism; and FIGS. 11, 12, and 13 are fragmentary views to illustrate various sequential positions assumed by the intermittent driving mechanism for the controller, with portions of the crank gear assembly not being shown for purposes of simplification.

Referring in detail to the drawings, and in particular at first to FIGS. 1, 4 and 6, there is shown a sequence controller 1 having a suitable timing motor 3, an intermittent drive mechanism 5, a main rotatable switch operating unit 6, and switching mechanisms 7 and 8. Motor 3, as illustrated, is of the self-starting synchronous type, and it transmits rotary motion from output pinion 9 at the desired number of revolutions per minute for drive mechanism 5 to intermittently rotate switch operating unit 6 and thereby actuate switching mechanisms 7 and 8.

To simply, efficiently and compactly support and contain the various elements of sequence controller 1 in a relatively small housing, as shown in FIGS. 1, 4, and 6, the controller includes a rectangular switch casing 11 formed by front and back plates 13 and 15 respectively, terminal boards 17 and 18, and spacer plates 21 and 23 (FIG. 4). More particularly, the front and back plates 13 and 15 have rectangular slots 25 and 27 respectively, formed near their elongated outer sides. The slots 25 and 27 receive and cooperate with mating rectangular bosses 29 projecting edgewise from opposite elongated sides 31 of the terminal boards 17 and 18 (as shown in FIG. 1). It will thus be seen that terminal boards 17 and 18 serve structurally as elongated sides for casing 11 and space front and back plates 13 and 15 apart in parallel fashion, as shown in FIG. 6.

To rigidly secure front and back plates 13 and 15 in cooperative engagement with terminal boards 17 and 18 (i.e., with slots 25 and 27 mating with bosses 29), spacer plates 21 and 23 each include two oppositely disposed pairs of spaced apart fingers 33, such as the pair of fingers shown on plate 23 in FIG. 5. Fingers 33 of the spacer plates are received within narrow slots 35 formed adjacent the shorter ends of the front and back plates 13 and 15 and are turned over on the outer faces of the front and back plates to secure the parts of the casing together. It will thus be seen that by means of front and back plates 13 and 15, terminal boards 17 and 18 which cooperate with these plates, and spacer plates 21 and 23 which secure the casing together, a simplified and compact housing for the switching mechanism has been thereby obtained.

Timing motor 3 is attached to the front side of back plate 15, as shown in FIG. 1, by means of screws 37 which extend through apertures of ears 39 of the housing 41 of the motor. Screws 37 thread into engagement with apertures (not shown) of the back plate 15 to securely attach the timing motor 3 thereto. Pinion 9 of motor 3 extends rearwardly, as shown in FIG. 4, through circular aperture 42 (FIG. 9) of back plate 15. Flanged sides 43 are turned perpendicularly rearwardly from the flat principal surface of back plate 15. The outer or rearward edge of each of the sides 43 has a plurality of recesses 45 which cooperate with and are engaged by ears 47 of support plate 49 in the manner illustrated representatively in FIG. 9. Support plate 49 is rigidly held in spaced parallel relationship with back plate 15 by a plurality of spacers 51 (such as the one shown in FIG. 4), which are staked to each of the plates 15 and 49 in the same manner as described for spacer plates 21 and 23. As shown in FIG. 6, back plate 15 and support plate 49 cooperate to provide a shallow box-like cavity for the gear train of the intermittent drive mechanism 5. (See also FIG. 4.)

As best shown in FIG. 9, motor pinion 9 is in mesh with gear 53. Gear 55 is attached to the same shaft as gear 53 and is rotatable therewith. The combination of gears 53 and 55 provides a reduction gearing means for reducing the speed of angular rotation provided by motor pinion 9. It will be understood by those skilled in art that for other applications, a simple idler gear or any other suitable intermediate gear assembly might also be expeditiously utilized. Gear 55 meshes with crank gear 57. As best shown in FIGS. 4 and 9, crank gear 57 is attached to shaft 59. Shaft 59 is journalled at its outer bottom end 62 to support plate 49. Auxiliary gear 61 is also attached to shaft 59 and arranged coaxially upon gear 57. The purpose of auxiliary gear 61 shall be described in detail hereinafter. The upper or inner end portion 63 of crank gear shaft 59, as shown in FIG. 11, resembles a crank pin in that it is eccentric to the axis of crank gear 57 and the bottom end 62 of shaft 59 (FIG. 4). The purpose of eccentric inner end portion 63 of crank gear shaft 59 shall now be described.

For an understanding of the purpose and operation of the eccentric inner end portion 63 of crank shaft 59, attention is drawn to FIGS. 9 and 11–13. Between the eccentric inner end portion 63 (FIG. 11) and the other end 62 of the shaft (FIG. 4), an enlarged disc portion 65 is formed. Disc portion 65 is coaxial to crank gear 57 and end 62 of the crank gear shaft 59. Annular groove 67 is formed in the eccentric portion 63 of the shaft between disc portion 65 and the adjacent outer extremity thereof. (See FIG. 5.)

As shown in FIG. 11, locking lever 69 is pivotally mounted on the inner side of back plate 15 by rivet 71. Lever 69 includes hooked ear 73 which is connected to an associated hooked end of tension spring 75, circular aperture 77 which is larger in diameter than disc portion 65 of crank gear shaft 59 and generally surrounds it, and outer tooth-shaped locking end 79. Between the outer extremity of eccentric portion 63 and disc portion 65, pawl 81 is rotatably journalled upon eccentric portion 63. The bottom end of pawl 81, as shown in FIGS. 5 and 11, has an aperture 83 which receives eccentric portion 63 of crank shaft 59. The C-shaped clip 85 fits into annular groove 67 of eccentric portion 63 to retain pawl 81 in its proper axial position upon eccentric portion 63. Pawl 81 also includes notched arm 87 and tooth-shaped driving end 89. Notched arm 87 is hooked into engagement with one end of tension spring 91.

As shown in FIG. 11, locking lever spring 75 has its one end attached to hooked ear 73 of lever 69 and the other end attached to lanced tab 92 of back plate 15. Spring 75 runs in tension to continuously bias locking lever 69 in a clockwise direction about rivet 71 (viewing FIG. 11), and thereby urges locking end 79 of the locking lever toward ratchet wheel 93. Pawl spring 91 has its one end affixed to notched arm 87 of the pawl 81 and the other end attached to a rivet which is fastened to back plate 15. Spring 91 runs in tension to continuously urge pawl 81 in a clockwise direction (viewing FIG. 11), and thereby biases driving end 89 of the pawl toward ratchet wheel 93.

Turning now to an explanation of the operation of the intermittent drive mechanism 5 of sequence controller 1, it will be seen that when timing motor 3 is energized, it drives pinion 9. Pinion 9 is in continuous mesh with gear 53 and thereby also drives the attached gear 55 (FIG. 9). If it is supposed that motor pinion 9 is driving in a counterclockwise direction of rotation from its position as shown in FIG. 11, gears 53 and 55 will then be driven in a clockwise direction of rotation. Gear 55 meshes with crank gear 57 and thus drives it in a counterclockwise direction of rotation. With locking lever 69 and pawl 81 in the pivotal or angular positions where they are shown in FIG. 11, the axis of eccentric portion 63 of the crank gear shaft 59 is disposed to the left of the axis of disc 65. With locking lever 69 and pawl 81 in these positions, locking end 79 engages between teeth 95a and 95b of ratchet wheel 93 above driving end 89 of the pawl (FIG. 11), and pawl end 89 engages notch 96b behind or underneath the tooth 95b of the ratchet wheel. Locking end 79 is then holding ratchet wheel 93 in position and the pawl is just beginning to drive.

As crank gear 57 rotates in a counterclockwise direction from the rotary position which it assumes in FIG. 11, eccentric portion 63 of crank gear shaft 59 moves to the angular position where it is shown in FIG. 12. Driving end 89 of pawl 81 thus drives tooth 95b of ratchet wheel 93 in a clockwise direction to the position where it is shown in FIG. 12. As tooth 95b is driven from its position in FIG. 11 to its position in FIG. 12, locking end 79 of the locking lever 69 rides out of the notch 96a between the ratchet wheel teeth 95a and 95b to where it is shown in FIG. 12.

As crank gear 57 then rotates in a further counterclockwise direction from its position in FIG. 12 to its position in FIG. 13, driving end 89 drives ratchet wheel tooth 95b to the angular location where it is shown in FIG. 13. Locking end 79 then enters the notch 96b which has been engaged by pawl end 89. When eccentric portion 63 is then rotated further in a counterclockwise direction from where it is shown in FIG. 13, back toward its position in FIG. 11, pawl driving end 89 moves out of its driving notch 96b and eventuates at notch 96c. Locking end 79 holds ratchet wheel 93 in the position where it is shown in FIG. 13, until driving end 89 begins to drive the ratchet wheel from notch 96c.

It will thus be seen by those skilled in the art that by means of locking lever 69 and pawl 81, an efficient means has been provided for intermittently driving ratchet wheel 93 in response to continuous rotation of timing motor pinion 9. Pawl 81 has been driven in a sinusoidal fashion to rotate the ratchet wheel 93.

Turning now to an important aspect of the present invention, as shown in FIG. 5, the main rotatable switch operating unit 6 comprises a series of cam members 97 which are stacked coaxially upon ratchet wheel 93. All of the cam members 97 are similar to each other and have the form shown in FIGS. 7 and 8. More particularly, each of the cam members 97 is of one-piece molded construction and is characterized by a cylindrical bore 99 which extends generally perpendicularly between top and bottom ends 101 and 103 (FIG. 7). The bores 99 surround and receive cam shaft 105 after the various cam members have been stacked one upon the other and fastened together, as shall be described hereinafter.

As shown in FIGS. 7 and 8, cam member 97, in general, resembles a frusto-conically stepped wafer. Each cam member has three principal concentric and parallel cylindrical surfaces 107, 109 and 111. The diameter of cylindrical surface 107 is larger than the diameter of cylindrical surface 109, and the diameter of cylindrical surface 111 is smaller than that of cylindrical surface 109. The arrangement of cylindrical surfaces 107, 109, and 111 thus provides a cam member 97 which in general resembles a stack of integrated coaxially arranged discs having their outer peripheries progressively decreasing in radii between top end 101 and bottom end 103. Each cam member also has a concentric surface 112 of less diameter than surface 111. Surface 112 is a manufacturing expedient in molding the cam member 97, serving as an integral spacing means to allow for manufacturing tolerances in mating parts.

To diminish the amount of molded material required in manufacturing cam members 97, recesses 113 have been formed in bottom end 103 (FIGS. 7 and 8). It will be understood by those skilled in the art that a plurality of recesses may also be formed at either or both ends of the cam member 97 to afford similar advantage.

To fasten cam members 97 together with ratchet wheel 93 in a stack-like coaxial arrangement, each cam member 97 and the ratchet wheel 93 have a plurality of axially extending arc-shaped slots 115 formed therein in the same radial and angular disposition (FIG. 8). By means of the present invention, cam members 97 are stacked uniformly one upon the other with the cylindrical surfaces 111 of smallest diameter for one cam member closely adjacent to cylindrical surfaces 107 of the largest diameter for an axially adjacent cam member (as shown in FIG. 6). To properly orient the cam members 97 and ratchet wheel 93 axially with respect to each other before fastening them together, locating notches 117 have been formed in cylindrical surfaces 107 of the cam members 97. The locating notches of cylindrical surfaces 107 are registered with a specific tooth on the ratchet wheel 93. The cylindrical bores 99 of cam members 97 are then in axial alignment with a bore of ratchet wheel 93 (not shown), and the arc-shaped slots 115 are also in axial alignment. The ratchet wheel and the cam members are then locked together by injecting a fusible material such as thermoplastic or a low melting point metal alloy into the slots 115.

It will thus be seen that by means of the present invention, cylindrical surfaces 107, 109, and 111 of each cam member 97 are progressively and concentrically stepped along the axis of the cam member and that these cam members are fastened to ratchet wheel 93 to form the main switch operating unit 6. To enable the cylindrical surfaces 109 and 111 to each operate one of the cam followers 119 and 120, each of these cylindrical surfaces has at least one radial discontinuity formed therein. These discontinuities are represented as peripheral interruptions 121 in FIGS. 5 and 8. It will be understood by those skilled in the art that while the radial discontinuities (e.g. 121), as shown in FIG. 6, are peripheral interruptions or indentations, the present invention is not necessarily limited to such structure and other various configurations of these discontinuities, such as radial projections (not shown), could be formed upon the cylindrical surfaces 109 and 111 of the cam members 97 to operate the followers 119 and 120.

As a further aspect of the present invention, to provide an improved means for efficiently actuating the switching devices of the sequence controller 1 within a relatively small spacial area of the controller housing, two oppositely disposed groups of the pivoted followers 119 and 120 are utilized. One of these groups is disposed about an axis parallel to cam shaft 105 on each side of the main switch operating unit 6. More particularly, shafts 123 are each suitably positioned through apertures 125 of front plate 13 and back plate 15 (FIG. 5) and are held therein by engagement with a C-shaped clip 126 and shoulder 127 formed at the bottom end of the shaft (FIG. 4). Shoulder 127 engages the inner side of support plate 49, as shown in FIG. 4. C-shaped clip 126 engages the surface of back plate 15 facing support plate 49.

As best shown in FIG. 5, the followers 119 and 120 resemble each other in over-all appearance, but they are slightly different from each other structurally. The reason for this structural dissimilarity in the followers shall become apparent hereinafter. More particularly, followers 119 each have a stepped hub portion 129 with a bearing aperture therein (FIGS. 4 and 5). Hub portion 129 is relatively thin in depth and generally coplanar with a radially spaced cam engaging point 131. Point 131 of each of the followers 119 has a relatively thin configuration to enable it to engage a cylindrical surface 111 of cam member 97 and ride thereupon (FIG. 6). On the other side of each of the followers 119, a switch actuating point 133 is formed. (See FIG. 5.) Actuating point 133 is thus angularly spaced from cam engaging point 131 and it is also disposed at a greater radial dimension from hub portion 129. Switch actuating points 133 are considerably thicker than cam engaging points 131, and extend in a direction generally opposite to that of the cam engaging point 131.

Followers 120, are similar to the followers 119 in that they also provide stepped hub portions 135. But cam engaging points 137 of followers 120 (FIG. 5) are each of the same thickness as switch actuating points 133 of followers 119. In addition, switch actuating points 139 are provided on each of the followers 120. Points 139 have the same depth and are of the same configuration as points 133 of followers 119.

Turning now to a consideration of the arrangement of the cam followers 119 and 120, as shown in FIG. 5, they are stacked in alternate angularly separated disposition with shaft 123 extending through apertures formed in the hub portions 129 and 135. More particularly, on each side of the operating unit 6, there is a series of pairs of axially adjacent followers 119 and 120 which are angualrly spaced with respect to each other. As shown in FIG. 4, it will be seen that hub portions 129 and 135 for each pair of axially adjacent followers 119 and 120 cooperate via the stepped configurations thereof so that each follower 119 is substantially coplanar with its associated axially adjacent follower 120. The relatively thick cam engaging point 137 of follower 120 engages cylindrical surface 109 (FIG. 7) of an associated cam member 97 and is actuated thereby, and the relatively thin cam engaging point 131 of axially adjacent and angularly spaced follower 119 engages an associated cylindrical surface 111 of the same cam member and is actuated thereby. (See also FIG. 4.)

As thus shown in FIG. 6, followers 119 and 120 are pivotally arranged on each of the shafts 123 in essentially the same manner. It will be noted, however, that axially adjacent cam followers 119 and 120 on one of the shafts 123 (FIG. 4) are controlled by one of the cam members 97 and another pair of axially adjacent followers 119 and 120 diametrically disposed on the other side of the cam stack are controlled by the cylindrical surfaces of the next cam member, etc. This arrangement of the followers provides control of the main switch operating unit 6 in four quadrants, with close axial spacing of the followers, and significantly enhances the smallness in size of the controller 1 for providing a multiplicity of controlling functions.

When cam members 97 are uniformly stacked together to form main actuating unit 6, as shown in FIG. 6, each pair of axially adjacent cam members 97 provides overlying upper and lower annular surfaces 138 and 140, respectively. The surfaces 138 and 140 are provided by the formation of the cylindrical surfaces 107 (of largest diameter) of the cam members. Surfaces 138 and 140 are also perpendicular to surfaces 107, and they serve a very important function in controller 1. More particularly, each pair of opposed annular surfaces 138 and 140 provides a stepped or L-shaped annular channel 142. Channels 142 each efficiently trap or axially position an axially adjacent pair of followers 119 and 120 in the desired axial location for engagement with its associated cam member. (See also FIGS. 1 and 4.) It will thus be seen that by means of the present invention, a simple means integral to the cam members has been achieved for expeditiously positioning the followers axially upon their shafts.

In viewing FIG. 6, it will be noted further that one follower 120 is omitted for controlling the bottom cam member 97. The reason for this, as shall become apparent hereinafter, is to enable one of the controller switches to be controlled manually by cam shaft 105.

As shown in FIGS. 2 and 3, each of the terminal boards 17 and 18 provide six single pole single throw switches. For this purpose, three fixed contact terminals 141 are arranged linearly in rows and in parallel fashion near each end of the terminal boards 17 and 18, as shown in FIG. 5. Each of the fixed contact terminals 141 is extended through a suitable aperture and staked uniformly to the terminal board, as shown in FIG. 3, with a fixed contact 143 and supporting blade 144 attached to the inner side thereof. The supporting blades for the fixed contacts 143 are thus arranged in coplanar fashion on each side of the terminal board with the fixed contacts 143 facing into molded terminal board recesses 145 (FIG. 3). Disposed between each of the rows of contact terminals 141 are two adjacent parallel rows which each include three movable contact terminals 147. Terminals 147 are uniformly arranged in the same manner as fixed contact terminals 141 and each of these terminals is staked to the associated terminal board with a movable contact blade 149 and associated movable contact 151 also being staked thereto. Movable contact blades 149 are arranged uniformly in cantilever fashion with each blade normally biasing its movable contact 151 into engagement with an associated fixed contact 143.

To provide the desired biasing force for maintaining the switch contacts 143 and 151 in normal closure, as shown in FIG. 3, each contact recess 145 also has a well 153 formed therein. A compression spring 155 extends from a seat in this well to the bottom of movable contact blade 149 (viewing FIG. 3), and is laterally positioned against the blade by a lanced tab. Spring 155 runs in compression between the bottom of well 153 and the bottom of spring blade 149, as shown in FIG. 3, to normally bias movable contacts 151 into engagement with their associated fixed contacts 143. It will be understood by those skilled in the art that various other ways of normally biasing movable contact blades 149 into engagement with their associated fixed contacts may also be used with similar advantage being afforded thereby.

To afford efficient space utilization, each of the terminal boards 17 and 18 is positioned on one side of the controller 1, as shown in FIG. 1, with its fixed and movable contact terminals 141 and 147 perpendicularly overlying the planes of the flanged sides 43 of back plate 15. The boards 17 and 18 are thus oppositely disposed and in parallel relationship. Each board has thereon two rows of three normally closed switches arranged next to each other, and thereby provides six substantially coplanar switching devices. With the boards 17 and 18 disposed opposite to each other, a total of twelve single pole single throw switches has been provided in a relatively small area. The terminal boards 17 and 18 are also interchangeable and may be used on either side of the switch when they are inverted. (See FIG. 6.) It will be understood by those skilled in the art that other terminal boards similar to terminal boards 17 and 18 may also be expeditiously arranged at each end of the controller housing (such as, for example, where spacer plates 21 and 23 have been shown in FIG. 4) to provide a controller with an even greater circuit controlling capability.

With the terminal boards 17 and 18 positioned in controller 1, one of the groups of followers 119 and 120 is located adjacent to and inwardly of each terminal board (FIG. 1). The cam engaging points 137 of followers 120 of one group (e.g., the group next to board 17) ride upon cylindrical surfaces 109 (FIG. 6) of alternate cam members 97 and the cam engaging points 131 of that same group of followers are angularly spaced from the points 137 thereof and ride upon cylindrical surfaces 111 of the same alternate cam members 97 as points 137 of that group. As previously mentioned, each axially adjacent pair of followers 119 and 120 is substantially coplanar, and these followers are controlled by the cylindrical surfaces 109 and 111 of one associated cam member 97.

The cam engaging points 137 and 131 of followers 120 and 119 on the other group (e.g., the group next to board 18) are arranged in the same manner as described for terminal board 17. Each axially adjacent pair of followers 119 and 120 of this second group is controlled by the cylindrical surfaces 109 and 111 of one associated cam member 97 that is consecutive to a cam member 97 controlled by the first described group. (See FIG. 4.)

Turning now to a discussion of the operation of the switches of controller 1 by cam followers 119 and 120, attention is directed to FIGS. 1 and 6. The followers 119 and 120 are pivotally arranged upon their bearing shafts 123 so that the cam engaging points 131 and 137 ride upon cylindrical surfaces 111 and 109 between the annular surfaces 138 and 140 of axially adjacent cam members 97. The annular surfaces 138 and 140, as previously set forth, thus serve as integral trapping rings for axially segregating and positioning each of the cam followers upon its bearing shaft 123.

With each pair of axially adjacent followers 119 and 120 positioned alongside of the cam member 97 which is to control it (as shown in FIG. 6), switch actuating points 133 and 139 are in engagement with associated movable contact blades 149 (FIG. 1). The compressive force urged upon each blade 149 by its spring 155 is therefore exerted upon points 133 and 139 of the followers to bias them radially about their axes toward the axis of the cam members 97. When the cam engaging point (e.g., point 137 of follower 120 in FIG. 1) is at its radially innermost position with respect to its associated cylindrical surface or cam track, it is held there by the biasing force of the movable contact blade which it engages. As the associated cam member 97 is then rotated intermittently by the previously described drive mechanism, when the cam engaging point reaches the radially outermost position of its cylindrical surface or cam track, it is cammed radially outwardly to overcome the biasing force of its movable contact blade and it opens the switch.

To provide an efficient and simplified means for enhancing the control flexibility for the followers of sequence controller 1, as shown in FIGS. 1 and 4, an auxiliary cam stack 161 has been utilized. The cam stack 161 is illustrated in perspective in FIGS. 5 and 5a and it includes shaft 163, with an annular shoulder 165 formed at each of its ends (FIG. 5), auxiliary cam gear 167, and three identical auxiliary cams 169. Gear 167 has a hub 173 of molded plastic material attached thereto. It will be understood that gear 167 and hub 173 may also be of one-piece die-cast construction. Hub 173 is concentric with gear 167 and is attached to shaft 163 by means of knurls formed thereon (not shown) which engage an aperture of hub 173. Hub 173 has a generally cylindrical configuration, and extends perpendicularly outwardly and upwardly (viewing FIG. 4) from the inner surface of cam gear 167. At the axially outermost end of hub 173, a series of box-shaped projections 175 are molded thereto. Projections 175 extend both axially and radially and are spaced transversely from the axis of hub 173 by an annular recess, such as recess 177 of cam 169. Between each of the projections 175, there is a radially and axially extending groove 179. It will thus be seen that the radially and axially extending projections 175 and grooves 179 resemble in appearance an annular castle-like structure.

Turning now to the structure of auxiliary cams 169, as shown in FIGS. 5 and 5a, each of these cams has an annular hub portion 181 which extends perpendicularly outwardly from each side of a radial cam portion 183. On each axially outermost end of hub portion 181, a series of box-shaped projections 175 and grooves 179 are molded thereto in the same manner as for cam gear hub 173. The projections 175 and grooves 179 also extend axially and radially in the same manner as those of cam gear hub 173 and they are of the same size.

After auxiliary cam gear 167 has been attached to its hub 173 and hub 173 has been fastened to shaft 163 in the axial position illustrated in FIG. 4, a first auxiliary cam 169 is co-axially arranged upon shaft 163, rotated to the desired predetermined camming position, and then interfitted or interdigitated by axial movement into engagement with hub 173. Hub 181 of cam 169 includes a central aperture (not shown) which is larger in diameter than shaft 163, and cam 169 is therefore free to rotate about shaft 163 until such time as the hubs 173 and 181 are interdigitated. To explain this procedure in greater detail, after a predetermined axial relationship between auxiliary cam gear 167 and auxiliary cam 169 is first obtained by rotating one with respect to the other, the castle-like combination of projections 175 and grooves 179 of the cam gear hub 173 cooperate with the identically configured projections 175 and grooves 179 on cam hub portion 181 to angularly interlock the auxiliry cam gear 167 to the first auxiliary cam 169 (FIG. 5a).

In the illustrated controller, after the first auxiliary cam 169 has been angularly interlocked with auxiliary cam gear 167 in the manner described, second and third auxiliary cams 169 are interlocked with the first one and with each other by the same procedure (See FIG. 4.)

To restrain auxiliary cams 169 from axial movement on shaft 163 after they have been interlocked, clamping sleeve 185 is fastened to one end of the shaft 163, as shown in FIG. 5.

It will thus be seen that auxiliary cam stack 161 includes an axially spaced integrated combination of concentrically disposed gear 167 and three radial cam portions 183, which is readily assembled and may be expeditiously adjusted. When cam stack 161 has been assembled and adjusted, shaft 163 is positioned within apertures of front plate 13 and support plate 49, with shoulders 165 engaging the inner surfaces of the plates (FIG. 4).

As shown in FIGS. 1 and 4, the cam portions 183 are axially positioned adjacent to and are engageable with an inwardly extending shoulder 187 of an associated cam follower 119. Back plate 15 has an enlarged aperture 189 through which hub 173 of auxiliary cam gear 167 is extended (FIG. 9). Gear 167 thus lies between back plate 15 and support plate 49, as shown in FIG. 4. Gear 167 is also continuously driven by auxiliary gear 61 whenever motor 3 is energized (FIG. 9). It will thus be seen that all of the cam portions are driven by gear 61, due to their integral attachment to auxiliary cam gear 167.

To describe the operation of cam stack 161, attention is directed to FIG. 1. When the radially innermost surface 191 of cam portion 183 is adjacent shoulder 187 of follower 119, it has no effect thereupon and is disengaged therefrom. However, in response to time driven rotation of gear 167 in a clockwise direction direction (viewing FIG. 1), when the radially outermost surface 193 of cam portion 183 is reached, follower 119 is engaged by the cam portion 193, and the associated movable contact blade is cammed to its contacts open position, as shown in FIG. 1.

It will be understood by those skilled in the art that other auxiliary cam stacks with any desired number of interdigitated cams and such as the illustrated cam stack 161 may also be used to provide time driven controlling functions for various other followers of controller 1, thereby enhancing the flexibility of control thereof.

To provide a means for manually controlling one of the switches of controller 1 and also setting the main cam stack, the cam shaft 105 has been provided. Shaft 105 is rotatably journalled through aperture 194 of front plate 13 (FIG. 5). Bushing 195 is attached to the ratchet wheel 93 and is also fitted into and attached to bearing bushing 197 (FIG. 9). Bearing bushing 197 is rotatably mounted in a suitable aperture of the back plate 15 by C-shaped clip 199. (See also FIG. 5). It will be understood by those skilled in the art that bushings 195 and 197 could be combined into a single bushing member attached to unit 6 or could also be made an integral part of ratchet wheel 93, with equivalent functional advantage being afforded thereby. Near bottom end 201 of shaft 105, keyway slot 203 (FIG. 5) is formed in the periphery of shaft 105. Slot 203 has a key 205 attached thereto, as is well known in the art, to enable shaft 105 to lock with a mating D-shaped aperture 207 formed in bushing 195. Key 205 of shaft 105 is aligned with and received within aperture 207 of bushing 195 so that ratchet wheel 93 and cam members 97 are locked to and rotatable with shaft 105.

To manually actuate one of the switches of the controller 1 by axial motion or reciprocation of cam shaft 105, a frusto-conical surface 209 (FIG. 10) is formed near the bottom end 201 of shaft 105. Surface 209 has its largest diameter closest to bottom end 201 and engages a V-shaped notch 211 formed at end 213 of a channel-shaped member 215. (See also FIG. 9.) Member 215 has its bight section 217 (FIG. 9) connected to a narrow slot of elongated section 219 of L-shaped actuator 221. The shorter section 223 of actuator 221 is disposed with its longitudinal axis generally parallel to cam shaft 105 and it extends perpendicularly to the plane of back plate 15 through enlarged slot 225 thereof (FIG. 9). As best shown in FIGS. 5 and 10, section 223 of actuator 221 bears a resemblance to a prismoid. More specifically, bottom portion 227 of actuator section 223 (FIG. 9) has an apex 229 which rides transversely along the adjacent surface of lanced tab 231 of the back plate 15 (FIG. 9). A furrow 233 (FIG. 10) is formed in portion 227 of the actuator to receive one side of a U-shaped wire spring 235. As shown in FIG. 9, one side of spring 235 engages an aperture in flanged side 43 of the back plate and the other side is received within furrow 233. Spring 235 runs in compression between the flanged side 43 and the actuator and urges apex 229 of the actuator to ride inwardly or away from the spring along tab 231.

In viewing FIGS. 9 and 10, it will be seen that when cam shaft 105 is pulled upwardly or away from where it is shown in FIG. 9 (i.e., when bottom end 201 moves toward back plate 15, as shown in FIG. 6), notch 211 of actuator channel member 215 is engaged by frusto-conical surface 209 of shaft 105 and thereby moved diagonally toward tab 231 (FIG. 9). Apex 229 of the actuator rides along the tab 231 against the force of spring 235, toward the adjacent flanged side 43 of the back plate. Top portion 237 (FIG. 10) of the prismoidally configured actuator section 223 extends through slot 225 alongside of one of the switches of controller 1, as shown in FIG. 6. Actuator portion 237 is disposed opposite to one of the movable contact blades 149, as illustrated in FIG. 10, and it includes an actuating apex 239. Apex 239 does not engage blade 149 when channel notch 211 is at the minimum diameter of frusto-conical shaft surface 209. But when shaft 105 is pulled outwardly from above controller 1, the motion of the shaft 105 cams the actuating apex 239 against its associated movable contact blade 149 to open the switch controlled thereby.

Shoulder 241 of actuator section 223 serves to properly position apexes 229 and 239 of the actuator in the controller, by riding along edge 243 of tab 231 (FIG. 5).

It will now, therefore, be seen that the improved sequence controller of the present invention includes a novel and improved mechanism for efficiently operating a plurality of switching devices in a predetermined sequence by intermittent rotary motion. It will further be seen that the sequence controller described herewith includes a compact structure which is very flexible and which, due to its simplicity, is relatively inexpensive to manufacture.

While in accordance with the Patent Statutes, we have described what at present is considered to be the preferred embodiment of our invention, it will be obvious to those skilled in the art that various changes and modifications may be made therein without departing from the invention, and we, therefore, aim in the following claims to cover all such equivalent variations as fall within the true spirit and scope of this invention.

What we claim as new and desire to secure by Letters Patent of the United States is:

1. Control mechanism for operating a plurality of control devices, comprising a rotatable operating unit, and a plurality of actuating means distributed about the axis of said operating unit and operated thereby to actuate said devices in sequence and complete a cycle of operation, said operating unit including a plurality of cam members stacked one upon the other in coaxial disposition, said cam members being similar and each having a cylindrical surface of larger diameter at one end thereof and a cylindrical surface of smaller diameter axially stepped therefrom, the cylindrical surface of larger diameter for one cam member being closely adjacent the cylindrical surface of smaller diameter of an adjacent other cam member to provide an annular channel formed by each adjacent pair of stacked cam members, one of said actuating means being continuously guided within each said channel and operated by an interruption in the cylindrical surface of smaller diameter of an associated cam member thereby to control one of said devices.

2. Control mechanism for operating a plurality of control devices, comprising a rotatable operating unit, and a plurality of coaxially disposed pivoted followers distributed about the axis of said operating unit and operated thereby to actuate said devices in sequence and complete a cycle of operation, said operating unit including a plurality of cam members stacked upon each other in coaxial disposition, said cam members being similar and each having a cylindrical surface of larger diameter at one end thereof and a cylindrical surface of smaller diameter stepped axially therefrom, the cylindrical surface of larger diameter for one cam member being closely adjacent the cylindrical surface of smaller diameter of an axially adjacent other cam member to provide an annular channel which includes each adjacent pair of stacked cam members and is disposed around the periphery of said other cam member, at least one of said followers being continuously guided within each said channel and operated by an interruption in the cylindrical surface of smaller diameter of an associated cam member thereby to control one of said devices.

3. Control mechanism for operating a plurality of control devices, comprising a rotatable operating unit, and a plurality of groups of coaxially disposed pivoted followers distributed about the axis of said operating unit and operated thereby to actuate said devices in sequence and complete a cycle of operation, each group of said followers being pivotally arranged upon a shaft disposed in parallel relationship to the axis of the rotatable operating unit, said operating unit including a plurality of cam members stacked upon each other in coaxial disposition, said cam members being similar to each other and each having a cylindrical surface of larger diameter at one end thereof and a cylindrical surface of smaller diameter stepped axially therefrom, the cylindrical surface of larger diameter for one cam member being closely adjacent the cylindrical surface of smaller diameter of an axially adjacent other cam member to provide an annular channel which includes each adjacent pair of stacked cam members and is disposed around the periphery of said other cam member, each of said followers having a portion which extends into and is continuously guided within an associated channel, said follower portions being operated by peripheral interruptions in the cylindrical surfaces of smaller diameter of associated cam members thereby to control the control devices.

4. Control mechanism for operating a plurality of control devices comprising a rotatable operating unit, and a plurality of actuating segments distributed about the axis of said operating unit and operated thereby to actuate said devices in sequence and complete a cycle of operation, said operating unit including a plurality of cam members stacked uniformly one upon the other in coaxial disposition, said cam members being similar and each having three cylindrical surfaces stepped axially in a frusto-conical configuration between its ends thereby to form cylindrical surfaces of largest, intermediate, and smallest diameters, the cylindrical surface of largest diameter for one cam member being closely adjacent the cylindrical surface of smallest diameter of an axially adjacent other cam member to provide a generally L-shaped annular channel which includes each axially adjacent pair of stacked cam members, said actuating segments being continuously guided within the channels and operated by interruptions in the cylindrical surfaces of intermediate and smallest diameters of associated cam members thereby to control said control devices.

5. Control mechanism for operating a plurality of control devices, comprising a rotatable operating unit, and a plurality of followers distributed about the axis of said operating unit and operated thereby to actuate said devices in sequence and complete a cycle of operation, said operating unit including a plurality of cam members stacked one upon the other in coaxial disposition, said cam members being similar and each having a cylindrical surface of larger diameter at one end thereof and a cylindrical surface of smaller diameter axially stepped therefrom, the cylindrical surface of larger diameter for one cam member being closely adjacent the cylindrical surface of smaller diameter of an axially adjacent other cam member to provide an annular channel which includes each axially adjacent pair of stacked cam members, a plurality of angularly spaced radially disposed slots uniformly formed in said cam members, said cam members being stacked in coaxial disposition with the slots aligned, and a fusible material extending through each aligned group of said slots holding said cam members together in a predetermined angular and coaxial disposition, said followers being continuously guided within the channels and operated by interruptions in cylindrical surfaces of smaller diameter of associated cam members thereby to control said devices.

6. The control mechanism of claim 5 wherein the cylindrical surfaces of larger diameter for the cam members have at least one locating notch formed therein, the locating notches of the cam members being arranged in registration to orient the cam members angularly with respect to each other.

7. Control mechanism for operating a plurality of electric switches comprising a housing, a rotatable operating unit disposed within said housing, and a plurality of groups of coaxially disposed pivoted followers distributed about the axis of said operating unit and operated thereby to actuate said switches in sequence and complete a cycle of operation, each group of said followers being pivotally arranged upon a shaft disposed in parallel relationship to the axis of the rotatable operation unit, said operating unit including a plurality of cam members stacked one upon each other in coaxial disposition, said cam members being similar to each other and each having a cylindrical surface of largest diameter at one end thereof and cylindrical surfaces of smaller and smallest diameters respectively stepped in axial progression from the surface of largest diameter, the cylindrical surface of largest diameter for one cam member being closely adjacent the cylindrical surface of smallest diameter of an axially adjacent other cam member to provide an annular channel which includes each axially adjacent pair of stacked cam members, each of said followers having a portion which extends into and is guided within an associated channel, said followers portions being operated by peripheral interruptions in associated cylindrical surfaces of smaller and smallest diameter thereby to contol the switches, said switches being arranged in generally coplanar configuration upon a plurality of terminal boards which serve as structural components of the controller housing.

8. Control mechanism for operating a plurality of electric switches comprising front and back plates that form a part of a housing, a rotatable operating unit disposed within said housing, and a plurality of groups of coaxially disposed pivoted followers distributed about the axis of said operating unit and operated thereby to actuate said switches in sequence and complete a cycle of operation, each group of said followers being pivotally arranged upon a shaft disposed in parallel relationship to the axis of the rotatable operating unit, said operating unit including a plurality of cam members stacked one upon each other in coaxial disposition, said cam members being similar to each other and each having a cylindrical surface of largest diameter at one end thereof and cylindrical surfaces of smaller and smallest diameters respectively stepped in axial progression from the surface of largest diameter, the cylindrical surface of largest diameter for one cam member being closely adjacent the cylindrical surface of smallest diameter of an axially adjacent other cam member to provide an annular channel which includes each axially adjacent pair of stacked cam members, each of said followers having a portion which extends into and is guided within an associated channel, said follower portions being operated by peripheral interruptions in associated cylindrical surfaces of smaller and smallest diameter thereby to control the switches, asid switches being arranged in generally coplanar configuration upon a plurality of terminal boards which serve as structural components of the controller housing, said terminal boards each having at least two bosses extending outwardly from the front and back ends thereof, said bosses being arranged to cooperatively engage mating slots of said front and back plates thereby to structurally unite said plates in spaced apart parallel disposition.

9. Control mechanism for operating a plurality of control devices, comprising a rotatable operating unit, and two groups of coaxially disposed pivoted followers distributed about the axis of said operating unit, an intermittent driving means for angularly stepping said unit to operate said followers and control said devices in sequence as a function of time, each group of said followers being pivotally arranged upon a shaft disposed in parallel relationship to the axis of the rotatable operating unit, the shaft for each group of followers being disposed on a diametrically opposite side of the operating unit from that of the other group, said operating unit including a plurality of cam members stacked upon each other in coaxial juxtaposition, said cam members being similar to each other and each having a cylindrical surface of larger diameter at one end thereof and a cylindrical surface of smaller diameter stepped axially therefrom, the cylindrical surface of larger diameter for one cam member being closely adjacent the cylindrical surface of smaller diameter of an axially adjacent other cam member to provide an annular channel which includes each adjacent pair of stacked cam members, each of said followers having a portion which extends into and is continuously guided within an associated channel, said follower portions being operated by peripheral interruptions in the cylindrical surfaces of smaller diameter of the cam members thereby to control the control devices.

10. Control mechanism for operating a plurality of control devices, comprising a rotatable operating unit, and two groups of coaxially disposed pivoted followers distributed about the axis of said operating unit and operated thereby to actuate said devices in sequence and complete a cycle of operation, each group of said followers being pivotally arranged upon a shaft disposed in parallel relationship to the axis of the rotatable operating unit, the shaft for each group of followers being disposed on a diametrically opposite side of the operating unit from that of the other group, said operating unit including a plurality of cam members stacked upon each other in coaxial juxtaposition, said cam members being similar to each other and each having three cylindrical surfaces stepped axially in a frusto-conical configuration between its ends thereby to form cylindrical surfaces of largest, intermediate, and smallest diameters, the cylindrical surface of largest diameter for one cam member being closely adjacent the cylindrical surface of smallest diameter of an axially adjacent other cam member to provide a generally L-shaped annular channel which includes each axially adjacent pair of stacked cam members, the followers of each coaxial group being arranged in axially adjacent pairs with the followers of each pair being spaced apart angularly relative to the axis of the cam members, a first follower of each pair having a cam engaging portion extending into and continously guided within an associated channel and controlled by a peripheral interruption in the cylindrical surface of smallest diameter of an associated cam member, the second follower of each pair having a cam engaging portion extending into and continuously guided within the same channel as the first follower and controlled by a peripheral interruption in the cylindrical surfaces of intermediate diameter of the same said cam member, said first and second followers of each pair thereby being controlled by a single cam member to actuate two control devices.

11. The control mechanism of claim 10 wherein alternate cam members of the rotatable operating unit each control a pair of associated axially adjacent followers of one coaxial group and alternate other cam members each control a pair of associated axially adjacent followers of the other coaxial group.

12. Control mechanism for operating a plurality of control devices comprising a rotatable operating unit, and a group of coaxially disposed pivoted followers distributed about the axis of said operating unit and operated thereby to actuate said devices in sequence and complete a cycle of operation, said operating unit including a plurality of cam members stacked uniformly one upon the other in coaxial disposition, said cam members being similar and each having three cylindrical surfaces stepped axially in a frusto-conical configuration between its ends thereby to form cylindrical surfaces of largest, intermediate, and smallest diameters, the cylindrical surface of largest diameter for one cam member being closely adjacent the cylindrical surface of smallest diameter of an adjacent other cam member to provide an L-shaped annular channel which includes each axially adjacent pair of stacked cam members, the followers of said group being arranged in axially adjacent pairs with the followers of each pair being spaced apart angularly relative to the axis of the cam members, a first follower of each pair having a cam engaging portion extending into and continuously guided within an associated channel and controlled by a peripheral interruption in the cylindrical surface of smallest diameter of an associated cam member, the second follower of each pair having a cam engaging portion extending into and continuously guided within the same channel as the first follower and controlled by a peripheral interruption in the cylindrical surface of intermediate diameter of the same said cam member, said first and second followers of each pair thereby being controlled by a single cam member to actuate two control devices.

13. The control mechanism of claim 12 wherein the followers of each axially adjacent pair have stepped hub portions, said hub portions being complementary to each other so that the followers of said pair are disposed in a substantially coplanar configuration.

14. The control mechanism of claim 12 wherein one of the control devices is manually operated, the means for operating said one control device comprising a reciprocating shaft and an actuator, said actuator being acted upon by said shaft and movable thereby in a direction transverse to the axis thereof to operate said one control device.

15. Control mechanism for operating a plurality of control devices, comprising a rotatable operating unit, and a plurality of actuating means distributed about the axis of said operating unit and operated thereby to actuate said devices in sequence and complete a cycle of operation, said operating unit including a plurality of cam members stacked one upon the other in coaxial disposition, said cam members being similar and each having a plurality of angularly spaced radially disposed slots formed therein, said cam members being stacked in coaxial disposition with the slots aligned, and a fusible material extending through each aligned group of said slots holding said cam members together in a predetermined angular and coaxial disposition, said actuating means being operated by interruptions in associated cam members thereby to control said devices.

References Cited by the Examiner
UNITED STATES PATENTS

| | | | |
|---|---|---|---|
| 1,512,034 | 10/1924 | Luitwieler | 74—567 |
| 2,344,253 | 3/1944 | Kirby | 74—567 X |
| 2,381,545 | 8/1945 | Kirby | 74—567 X |
| 2,642,503 | 6/1953 | Dietrich | 74—568 X |
| 2,788,850 | 4/1957 | Leuenberger | 74—567 X |
| 2,932,983 | 4/1960 | Laviana et al. | 74—567 |

BROUGHTON G. DURHAM, *Primary Examiner.*

DON A WAITE, *Examiner.*

T. W. SHEAR, *Assistant Examiner.*